United States Patent
Jiang et al.

(10) Patent No.: US 11,943,141 B2
(45) Date of Patent: Mar. 26, 2024

(54) METHOD AND NETWORK DEVICE FOR MANAGING MAC TABLE, STORAGE MEDIUM, AND PROGRAM PRODUCT

(71) Applicant: Huawei Technologies Co., Ltd., Shenzhen (CN)

(72) Inventors: Yu Jiang, Beijing (CN); Yaokun Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 247 days.

(21) Appl. No.: 17/451,514

(22) Filed: Oct. 20, 2021

(65) Prior Publication Data

US 2022/0038373 A1 Feb. 3, 2022

Related U.S. Application Data

(63) Continuation of application No. PCT/CN2019/119930, filed on Nov. 21, 2019.

(30) Foreign Application Priority Data

Apr. 22, 2019 (CN) .......................... 201910323657.4

(51) Int. Cl.
*H04L 45/745* (2022.01)
*H04L 101/622* (2022.01)

(52) U.S. Cl.
CPC ...... *H04L 45/745* (2013.01); *H04L 2101/622* (2022.05)

(58) Field of Classification Search
CPC ....................... H04L 45/745; H04L 2101/622
See application file for complete search history.

(56) References Cited

U.S. PATENT DOCUMENTS

| | | | |
|---|---|---|---|
| 2015/0016461 A1* | 1/2015 | Qiang | H04L 61/5046 370/392 |
| 2015/0304210 A1 | 10/2015 | Lin | |
| 2017/0093794 A1* | 3/2017 | Natu | H04L 63/0876 |
| 2017/0264530 A1* | 9/2017 | Hou | H04L 45/28 |
| 2020/0092200 A1* | 3/2020 | Velayudhan | H04L 61/10 |

FOREIGN PATENT DOCUMENTS

| | | |
|---|---|---|
| CN | 106470158 A | 3/2017 |
| CN | 107483329 A | 12/2017 |
| CN | 107547496 A | 1/2018 |
| CN | 108418759 A | 8/2018 |
| CN | 108512949 A | 9/2018 |
| CN | 108833280 A | 11/2018 |

\* cited by examiner

*Primary Examiner* — Donald L Mills
(74) *Attorney, Agent, or Firm* — Slater Matsil, LLP

(57) ABSTRACT

A method includes: A control plane of a network device obtains a first MAC entry, and sends the first MAC entry and a first identifier to a forwarding plane of the network device. The forwarding plane stores the first MAC entry in a first MAC table, and a state of the first MAC entry is set to a valid state. The forwarding plane changes the state of the first MAC entry to an invalid state after first preset duration elapses and when a first preset condition is met, and sets invalid duration for the first MAC entry. The first preset condition is that the forwarding plane does not receive traffic corresponding to a first MAC address within the first preset duration after storing the first MAC entry.

20 Claims, 6 Drawing Sheets

METHOD AND NETWORK DEVICE FOR MANAGING MAC TABLE, STORAGE MEDIUM, AND PROGRAM PRODUCT

CROSS-REFERENCE TO RELATED APPLICATIONS

This application is a continuation of International Application No. PCT/CN2019/119930, filed on Nov. 21, 2019, which claims priority to Chinese Patent Application No. 201910323657.4, filed on Apr. 22, 2019. The disclosures of the aforementioned applications are hereby incorporated by reference in their entireties.

TECHNICAL FIELD

This application relates to the field of communications technologies, and in particular, to a method and network device for managing a MAC table, a storage medium, and a program product.

BACKGROUND

An Ethernet virtual private network (EVPN) technology is a virtual private network (VPN) technology used for layer 2 network interconnection. The EVPN uses extended reachability information by extending a border gateway protocol (BGP), so that media access control (MAC) entry learning and advertisement processes between layer 2 networks of different sites are transferred from a data plane to a control plane.

In a related technology, MAC entry learning in an EVPN is to learn MAC entries in the entire network, and is implemented based on BGP routes. Therefore, MAC entries learned by a network device in the EVPN are MAC entries of all hosts in the entire EVPN, regardless of whether there is a service relationship between the host and the network device.

The MAC entries learned by a network device may include a MAC entry of a host that has no service relationship with the network device. These MAC entries will not be used. Therefore, a method for managing a MAC table needs to be provided.

SUMMARY

To resolve a problem in a related technology, this application provides a method and network device for managing a MAC table, a storage medium, and a program product. The technical solutions are as follows.

According to a first aspect, a method for managing a MAC table is provided. The method includes the following. A forwarding plane of a network device stores, in a first MAC table, a first MAC entry sent by a control plane, where a state of the first MAC entry is set to a valid state. The forwarding plane changes the state of the first MAC entry from the valid state to an invalid state, and sets an invalid duration for the first MAC entry. After the first MAC entry is stored in the forwarding plane, the state of the first MAC entry is changed to the invalid state after a first preset duration elapses and when a first preset condition is met. The first preset condition is that the forwarding plane does not receive traffic corresponding to a first MAC address within the first preset duration after storing the first MAC entry, and the first MAC address is a MAC address included in the first MAC entry.

In the solution in this embodiment of this application, during networking in an EPVN, the control plane of the network device may learn MAC entries based on a BGP peer, and the MAC entry includes a MAC address, an outbound interface corresponding to the MAC address, a broadcast domain, and the like. Then, the learned MAC entries (which may be referred to as the first MAC entry subsequently) are sent to the forwarding plane. After receiving the first MAC entry, the forwarding plane may store the first MAC entry in the first MAC table, and may set the state of the first MAC entry to the valid state. Then, after the first MAC entry is stored in the forwarding plane, the state of the first MAC entry is changed to the invalid state after the first preset duration elapses and when the first preset condition is met.

In this way, after a MAC entry is stored in the forwarding plane, the MAC entry is set to an invalid state if no traffic matches the MAC entry for a period of time. This makes management of the MAC entry more reasonable.

In a specific design, the method further includes the following. The forwarding plane sends a first message to the control plane, where the first message is used to instruct the control plane to set a second MAC entry that is stored in a second MAC table stored in the control plane to an invalid state, and the second MAC entry includes the first MAC address.

In the solution in this embodiment of this application, after setting the state of the first MAC entry to the invalid state, the forwarding plane may generate the first message, add an identifier (the identifier may be the first MAC address) of the first MAC entry to the first message, and then send the first message to the control plane. After receiving the first message, the control plane may parse the first message to obtain the identifier of the first MAC entry, then obtain the stored second MAC table, find, in the second MAC table by using the identifier of the first MAC entry, the second MAC entry corresponding to the identifier of the first MAC entry, and then set a flag of a state of the second MAC entry to a second identifier, to be specific, the state of the second MAC is updated from a valid state to the invalid state.

In this way, states of MAC entries of the control plane and the forwarding plane can be synchronized.

In a specific design, the method further includes the following. The forwarding plane deletes the first MAC entry from the first MAC table. After the first MAC entry is set to the invalid state, the first MAC entry is deleted after the invalid duration elapses and a second preset condition is met. The second preset condition is that the forwarding plane does not receive the traffic corresponding to the first MAC address within the invalid duration after setting the first MAC entry to the invalid state.

In the solution in this embodiment of this application, after setting the state of the first MAC entry to the invalid state, the forwarding plane may determine whether traffic whose destination address is the first MAC address (namely, the traffic corresponding to the first MAC address) is received within the invalid duration. If the traffic whose destination address is the first MAC address is not received within the invalid duration, the forwarding plane may delete the first MAC entry from the first MAC table, to save storage space of MAC entries of the forwarding plane.

In this way, a MAC entry in a valid state and a MAC entry in an invalid state are identified, and the MAC entry in the invalid state is preferably filtered out. This makes limitation of the MAC entry more accurate and improves an anti-attack effect of the EVPN.

In a specific design, the method further includes the following. The forwarding plane changes the state of the first MAC entry from the invalid state to the valid state, where the state of the first MAC entry is changed to the valid state after the forwarding plane receives the traffic corresponding to the first MAC address within the invalid duration.

In the solution in this embodiment of this application, after setting the state of the first MAC entry to the invalid state, the forwarding plane may determine whether traffic whose destination address is the first MAC address (namely, the traffic corresponding to the first MAC address) is received within the invalid duration. If the traffic whose destination address is the first MAC address is received within the invalid duration, the state of the first MAC entry may be updated from the invalid state to the valid state.

In this way, a frequently used MAC entry is generally not deleted. Therefore, when traffic corresponding to the MAC entry is received, the traffic may be forwarded based on the MAC entry. This can reduce a quantity of times that the traffic is broadcast or multicast.

In a specific design, the method further includes the following. The forwarding plane sends a second message to the control plane, where the second message carries a second MAC address and is used to request a third MAC entry, and the third MAC entry includes the second MAC address. The forwarding plane receives the third MAC entry sent by the control plane. The forwarding plane stores the third MAC entry in the first MAC table, and sets the third MAC entry to a valid state. The forwarding plane forwards, based on the third MAC entry, traffic corresponding to the second MAC address.

In the solution in this embodiment of this application, when receiving traffic, the forwarding plane may search, by using a destination MAC address in the traffic, the first MAC table for a MAC entry in which the destination MAC address is located. If the destination MAC address (which may be referred to as the second MAC address subsequently) does not exist, the forwarding plane may generate the second message, enable the second message to carry the second MAC address, and then send the second message to the control plane. The control plane may receive the second message sent by the forwarding plane, and then may traverse a stored MAC table by using the second MAC address, to determine whether the MAC entry to which the second MAC address belongs exists. If the MAC entry (namely, the third MAC entry) to which the second MAC address belongs exists, the control plane may send the third MAC entry and a first identifier to the forwarding plane, where the first identifier is used to instruct the forwarding plane to set the third MAC entry to the valid state. After receiving the third MAC entry sent by the control plane, the forwarding plane may store the third MAC entry in the first MAC table, and set the third MAC entry to the valid state. The forwarding plane may forward, based on the second MAC address, the traffic corresponding to the second MAC address. In this way, when subsequently receiving traffic whose destination address is the second MAC address, the forwarding plane may directly send the traffic based on the third MAC entry without by using the control plane.

In a specific design, when an occupation rate of storage space of MAC entries of the forwarding plane exceeds a first preset value, the second message further carries a third MAC address, where the third MAC address is a MAC address that is stored by the forwarding plane and has longest current invalid duration. The method further includes the following. The forwarding plane deletes a fourth MAC entry from the first MAC table, where the fourth MAC entry stores the third MAC address.

In the solution in this embodiment of this application, when receiving the traffic, the forwarding plane may search, by using the destination MAC address in the traffic, the first MAC table for the MAC entry in which the destination MAC address is located. If the destination MAC address (which may be referred to as the second MAC address subsequently) does not exist, a current occupation rate of the storage space of the MAC entries of the forwarding plane may be obtained. If the occupation rate exceeds the first preset value, a MAC address (namely, the third MAC address) that is in the MAC entries and that has the longest current invalid duration may be determined in the first MAC table, and the second message is sent to the control plane, where the second message carries the second MAC address and the third MAC address.

After receiving the second message, the control plane may determine whether a MAC table of the control plane stores a MAC entry of the second MAC address. If the MAC table of the control plane stores the MAC entry of the second MAC address, the control plane directly sends the third MAC entry to the forwarding plane.

If the MAC entry of the second MAC address is not stored in the MAC table of the control plane, but the control plane stores the third MAC entry of the second MAC address (in this case, the MAC entry of the second MAC address is generally not stored in the MAC table of the control plane, but is stored in another place), it may be determined whether a BGP MAC entry limit is deployed in the control plane. If the BGP MAC entry limit is deployed, the fourth MAC entry (the fourth MAC entry includes the third MAC address) may be deleted from the MAC table stored in the control plane. Then, the third MAC entry (the third MAC entry includes the second MAC address) is stored in the MAC table that is stored in the MAC table of the control plane, and the third MAC entry is sent to the forwarding plane. In this way, the MAC entries of the control plane and the forwarding plane can be synchronized, and the forwarding plane may further obtain a MAC entry that is not stored previously.

In a specific design, the method further includes the following. The forwarding plane sends a third MAC table to a control and management device at intervals of preset duration, where all MAC entries included in the third MAC table are set to a valid state, and the third MAC table is a subset of the first MAC table.

In the solution in this embodiment of this application, after going online, the forwarding plane may obtain, at the intervals of preset duration, a MAC entry that is marked as a valid state in a current first MAC table, to form the third MAC table, and then send the third MAC table to the control and management device. After receiving the third MAC table sent by the forwarding plane, the control and management device may replace a previously stored MAC table with the third MAC table received this time. In this way, the control and management device backs up the MAC in the valid state.

In a specific design, the method further includes: The forwarding plane receives a fifth MAC entry sent by the control plane, where the fifth MAC entry is determined by the control plane based on the learned MAC entries and the third MAC table, and the learned MAC entries are learned by the control plane based on the border gateway protocol BGP peer. The forwarding plane stores the fifth MAC entry in the first MAC table.

In the solution in this embodiment of this application, the forwarding plane may receive the fifth MAC entry sent by the control plane when a BGP session between the network device and the BGP peer is interrupted and reestablished, where the fifth MAC entry is determined by the control plane based on the learned MAC entries and the third MAC table. The forwarding plane may store the fifth MAC entry in the first MAC table. In this way, when the BGP session between the network device and the BGP peer is interrupted and reestablished, the forwarding plane may further receive a MAC entry to guide traffic forwarding.

In a specific design, that the forwarding plane receives a fifth MAC entry sent by the control plane includes the following. The forwarding plane receives the fifth MAC entry and the first identifier that are sent by the control plane, where the fifth MAC entry belongs to the third MAC table and belongs to the learned MAC entries, and the first identifier is used to instruct the forwarding plane to set the fifth entry to a valid state. The method further includes: The forwarding plane sets the fifth MAC entry to the valid state.

In the solution in this embodiment of this application, when the BGP session between the network device and the BGP peer is interrupted and reestablished, the forwarding plane may receive the fifth MAC entry and the first identifier that are sent by the control plane. The fifth MAC entry is determined by the control plane based on the learned MAC entries and the third MAC table. The forwarding plane may store the fifth MAC entry in the first MAC table, and set the fifth MAC entry to the valid state. In this way, when the BGP session between the network device and the BGP peer is interrupted and reestablished, the forwarding plane may further receive the MAC entry to guide traffic forwarding.

In a specific design, the occupation rate of the storage space of the MAC entries of the forwarding plane does not exceed a second preset value, and the method further includes: The forwarding plane receives a sixth MAC entry and the second identifier that are sent by the control plane, where the sixth MAC entry belongs to only the third MAC table or belongs to only the learned MAC entries, and the second identifier is used to instruct the forwarding plane to set the sixth entry to an invalid state. The forwarding plane stores the sixth MAC entry in the first MAC table, and sets the sixth MAC entry to the invalid state.

In the solution in this embodiment of this application, when the BGP session between the network device and the BGP peer is interrupted and reestablished, if the occupation rate of the storage space of the MAC entries of the forwarding plane does not exceed the second preset value, the forwarding plane may receive the sixth MAC entry and the second identifier that are sent by the control plane, where the sixth MAC entry belongs to only the third MAC table or belongs to only the learned MAC entries. The forwarding plane may store the sixth MAC entry in the first MAC table, and set the sixth MAC entry to the invalid state. In this way, when the storage space of the forwarding plane is sufficient, the control plane may further indicate the forwarding plane to distinguish between the MAC entry in the valid state and the MAC entry in the invalid state, and the MAC entry in the invalid state may be deleted as soon as possible. This can save the storage space of the MAC entries of the forwarding plane. In addition, a large quantity of MAC entries are delivered, which can reduce a probability that traffic is multicast or broadcast.

In a specific design, the method further includes the following. The forwarding plane receives the second identifier and the MAC entries in the third MAC table that are sent by the control plane. The forwarding plane stores the MAC entries in the third MAC table in the first MAC table, and sets the MAC entries in the third MAC table to an invalid state based on the second identifier.

In the solution in this embodiment of this application, when a BGP session between the network device and the BGP peer corresponding to the network device is disconnected and reestablished, the control plane may obtain the third MAC table from the control and management device, and may learn the MAC entries from the BGP peer by using a BGP. After receiving the third MAC table sent by the control and management device, the control plane may send the third MAC table to the forwarding plane. After receiving the third MAC table, the forwarding plane may store the MAC entries in the third MAC table in the first MAC table, and set these MAC entries to the invalid state. In this way, because a speed of obtaining the third MAC table is far less than that of learning the MAC entries from the BGP peer, traffic interruption duration can be shortened.

According to a second aspect, a method for managing a media access control MAC table is provided. The method includes the following.

A control plane of a network device obtains a first MAC entry. The control plane sends the first MAC entry and a first identifier to a forwarding plane of the network device. The first identifier is used to instruct the forwarding plane to set the first MAC entry to a valid state in a first MAC table, and the first MAC entry includes a first MAC address.

In the solution in this embodiment of this application, during networking in an EPVN, the control plane of the network device may learn, from another network device based on a BGP protocol, MAC entries (the learned MAC entries include the first MAC entry) of a CE device connected to the another network device. The another network device may be referred to as a BGP peer of the network device, and the MAC entry includes a MAC address, an outbound interface corresponding to the MAC address, a broadcast domain, and the like. After obtaining the first MAC entry, the control plane may send the first MAC entry and the first identifier to the forwarding plane of the network device. The first identifier is used to instruct the forwarding plane to set the first MAC entry to the valid state in the stored first MAC table, and the first MAC entry includes the first MAC address. In this way, the control plane may control the forwarding plane to set the MAC entry to the valid state.

In a specific design, the method further includes the following. The control plane receives a first message sent by the forwarding plane, where the first message carries the first MAC address and is used to instruct the control plane to set a second MAC entry that is stored in a second MAC table stored in the control plane to an invalid state, and the second MAC entry includes the first MAC address. The control plane sets the second MAC entry that is stored in the second MAC table stored in the control plane to the invalid state.

In the solution in this embodiment of this application, the control plane receives the first message of the forwarding plane, then may parse the first message to obtain an identifier of the first MAC entry, then obtains the stored second MAC table, finds, in the second MAC table by using the identifier of the first MAC entry, the second MAC entry corresponding to the identifier of the first MAC entry, and then sets a flag of a state of the second MAC entry to a second identifier, to be specific, the state of the second MAC entry is updated from a valid state to the invalid state. In this way, states of MAC entries of the forwarding plane and the control plane can be synchronized.

In a specific design, the method further includes the following. The control plane receives a second message sent by the forwarding plane, where the second message carries a second MAC address. The control plane sends a third MAC entry to the forwarding plane, where the third MAC entry includes the second MAC address.

In implementation, after receiving the second message, the control plane may parse the second message to obtain the second MAC address, and traverse a stored MAC table by using the second MAC address, to determine whether a MAC entry to which the second MAC address belongs exists. If the MAC entry (namely, the third MAC entry) to which the second MAC address belongs exists, the control plane may send the third MAC entry and the first identifier to the forwarding plane, where the first identifier is used to instruct the forwarding plane to set the third MAC entry to a valid state. In this way, when there is no MAC entry corresponding to a MAC address of traffic in the forwarding plane, the MAC entry may be obtained from the control plane.

In a specific design, when an occupation rate of storage space of MAC entries of the forwarding plane exceeds a first preset value, the second message further carries a third MAC address, where the third MAC address is a MAC address that is stored by the forwarding plane and has longest current invalid duration. That the control plane sends a third MAC entry to the forwarding plane includes: if the second MAC address exists in the control plane, and the second MAC address exists in the stored MAC table, sending the third MAC entry to the forwarding plane; or if the second MAC address exists in the control plane, the second MAC address does not exist in the stored MAC table, and a boundary gateway protocol BGP MAC entry limit is deployed, after a fourth MAC entry is deleted from the stored MAC table, adding the third MAC entry to the stored MAC table, and sending the third MAC entry to the forwarding plane, where the fourth MAC entry includes the third MAC address.

In the solution in this embodiment of this application, when receiving traffic, the forwarding plane may search, by using a destination MAC address in the traffic, the first MAC table for a MAC entry in which the destination MAC address is located. If the destination MAC address (which may be referred to as the second MAC address subsequently) does not exist, the forwarding plane may obtain the occupation rate of the storage space of the MAC entries of the forwarding plane. If the occupation rate exceeds the first preset value, the second message may be sent to the control plane, where the second message carries the second MAC address and the third MAC address. After receiving the second message, if the control plane stores the MAC entry of the second MAC address, the control plane directly sends the third MAC entry to the forwarding plane. If the MAC entry of the second MAC address is not stored in the MAC table of the control plane, but the third MAC entry of the second MAC address is stored in the control plane (in this case, the MAC entry of the second MAC address is generally not stored in the MAC table of the control plane, but is stored in another place), and if the BGP MAC entry limit is deployed, the fourth MAC entry (the fourth MAC entry includes the third MAC address) may be deleted from the MAC table stored in the control plane, then the third MAC entry (the third MAC entry includes the second MAC address) is stored in the MAC table stored in the control plane, and the third MAC entry is sent to the forwarding plane. In this way, the MAC entries of the forwarding plane and control plane can be synchronized.

In a specific design, the method further includes the following. The control plane sends a MAC table obtaining request to a control and management device when a BGP session between the network device and the BGP peer is interrupted and reestablished. The control plane receives a third MAC table sent by the control and management device. The control plane determines a fifth MAC entry based on the learned MAC entries and the third MAC table, where the learned MAC entries are learned by the control plane based on the BGP peer. The control plane sends the fifth MAC entry to the forwarding plane.

In the solution of in this embodiment of this application, when the BGP session between the network device and the BGP peer corresponding to the network device is interrupted and reestablished, the control plane may obtain the third MAC table from the control and management device, learn the MAC entries from the BGP peer based on the BGP protocol, then may use the learned MAC entries and the third MAC table to determine the fifth MAC entry, and send the fifth MAC entry to the forwarding plane.

In a specific design, that the control plane determines a fifth MAC entry based on the learned MAC entries and the third MAC table includes: The control plane determines a MAC entry that belongs to the third MAC table and belongs to the learned MAC entries as the fifth MAC entry. That the control plane sends the fifth MAC entry to the forwarding plane includes: The control plane sends the fifth MAC entry and the first identifier to the forwarding plane, where the first identifier is used to instruct the forwarding plane to set the fifth MAC entry to a valid state.

In the solution of in this embodiment of this application, the control plane may determine an intersection set of MAC entries in the third MAC table and the MAC entries learned from the BGP peer, and determine a MAC entry in the intersection set as the fifth MAC entry. The control plane may send the fifth MAC entry and the first identifier to the forwarding plane, so that the forwarding plane sets the fifth MAC entry to the valid state. In this way, a MAC entry in a valid state can be provided for the forwarding plane.

In a specific design, the occupation rate of the storage space of the MAC entries of the forwarding plane does not exceed a second preset value, and the method further includes the following. The control plane determines a MAC entry that belongs to only the third MAC table or belongs to only the learned MAC entries as a sixth MAC entry. The control plane sends the sixth MAC entry and the second identifier to the forwarding plane, where the second identifier is used to instruct the forwarding plane to set the sixth MAC entry to an invalid state.

In the solution in this embodiment of this application, before delivering a MAC entry to the forwarding plane, the control plane may obtain a current occupation rate of the MAC entries of the forwarding plane. If the occupation rate does not exceed the second preset value, it may be determined that the MAC entry that belongs to only the third MAC table or belongs to only the MAC entries learned from the BGP peer as the sixth MAC entry, and then the sixth MAC entry and the second identifier are sent to the forwarding plane. After receiving the sixth MAC entry and the second identifier, the forwarding plane may store the sixth MAC entry in the first MAC table, and set the state of the sixth MAC entry to the invalid state. In this way, when the storage space of the forwarding plane is sufficient, the control plane may indicate the forwarding plane to distinguish between the MAC entry in the valid state and a MAC entry in an invalid state, and the MAC entry in the invalid state may be deleted as soon as possible. This can save the storage space of the MAC entries of the forwarding plane.

In addition, a large quantity of MAC entries are delivered, which can reduce a probability that traffic is multicast or broadcast.

In a specific design, the method further includes the following. The control plane sends a MAC table obtaining request to a control and management device when a BGP session between the network device and the BGP peer is interrupted and reestablished. The control plane receives a third MAC table sent by the control and management device. The control plane sends MAC entries in the third MAC table and the second identifier to the forwarding plane, where the second identifier is used to instruct the forwarding plane to set the MAC entries in the third MAC table to an invalid state.

In the solution in this embodiment of this application, when the BGP session between the network device and the BGP peer is interrupted and reestablished, the control plane may obtain the third MAC table from the control and management device, and send the third MAC table to the forwarding plane, to guide traffic forwarding of the forwarding plane. In this way, because a speed of obtaining the third MAC table is far less than that of learning the MAC entries from the BGP peer, traffic interruption duration can be shortened.

According to a third aspect, a method for managing a media access control MAC table is provided. The method includes the following.

A control and management device receives a third MAC table sent by a forwarding plane of a network device at intervals of preset duration, where all MAC entries included in the third MAC table are set to a valid state. The control and management device replaces, with the third MAC table, a currently stored MAC table corresponding to the forwarding plane.

In the solution in this embodiment of this application, the control and management device may back up a MAC entry that is in a valid state and that is of the forwarding plane of the network device, so that the MAC entry is obtained from the control and management device after the forwarding plane loses the MAC entry.

In a specific design, the method further includes: The control and management device receives a MAC table obtaining request sent by a control plane of the network device. The control and management device sends the third MAC table to the control plane.

In the solution in this embodiment of this application, when a BGP session between the network device and a BGP peer is interrupted and reestablished, the control plane of the network device may obtain the third MAC table from the control and management device.

According to a fourth aspect, a network device for managing a MAC table is provided, where a forwarding plane of the network device includes a storage module, a processing module, a sending module, and a receiving module.

The storage module is configured to store, in a first MAC table, a first MAC entry sent by a control plane, where a state of the first MAC entry is set to a valid state.

The processing module is configured to change the state of the first MAC entry from the valid state to an invalid state, and set invalid duration for the first MAC entry.

After the first MAC entry is stored in the forwarding plane, the state of the first MAC entry is changed to the invalid state after first preset duration elapses and when a first preset condition is met. The first preset condition is that the forwarding plane does not receive traffic corresponding to a first MAC address within the first preset duration after storing the first MAC entry, and the first MAC address is a MAC address included in the first MAC entry.

In a specific design, the sending module is further configured to: send a first message to the control plane, where the first message is used to instruct the control plane to set a second MAC entry that is stored in a second MAC table stored in the control plane to an invalid state, and the second MAC entry includes the first MAC address.

In a specific design, the processing module is further configured to: delete the first MAC entry from the first MAC table, where after the first MAC entry is set to the invalid state, the first MAC entry is deleted after the invalid duration elapses and a second preset condition is met, and the second preset condition is that the forwarding plane does not receive the traffic corresponding to the first MAC address within the invalid duration after setting the first MAC entry to the invalid state.

In a specific design, the processing module is further configured to: change the state of the first MAC entry from the invalid state to the valid state, where the state of the first MAC entry is changed to the valid state after the forwarding plane receives the traffic corresponding to the first MAC address within the invalid duration.

In a specific design, the sending module is further configured to: send a second message to the control plane, where the second message carries a second MAC address and is used to request a third MAC entry, and the third MAC entry includes the second MAC address; the receiving module is further configured to: receive the third MAC entry sent by the control plane; and the processing module is further configured to: store the third MAC entry in the first MAC table, and set the third MAC entry to a valid state; and forward, based on the third MAC entry, traffic corresponding to the second MAC address.

In a specific design, when an occupation rate of storage space of MAC entries of the forwarding plane exceeds a first preset value, the second message further carries a third MAC address, where the third MAC address is a MAC address that is stored by the forwarding plane and has longest current invalid duration; and the processing module is further configured to delete a fourth MAC entry from the first MAC table, where the fourth MAC entry stores the third MAC address.

In a specific design, the sending module is further configured to: send a third MAC table to a control and management device at intervals of preset duration, where all MAC entries included in the third MAC table are set to a valid state, and the third MAC table is a subset of the first MAC table.

In a specific design, the receiving module is further configured to: receive a fifth MAC entry sent by the control plane, where the fifth MAC entry is determined by the control plane based on learned MAC entries and the third MAC table, and the learned MAC entries are learned by the control plane based on a border gateway protocol BGP peer; and the storage module is further configured to store the fifth MAC entry in the first MAC table.

In a specific design, the receiving module is further configured to: receive the fifth MAC entry and a first identifier that are sent by the control plane, where the fifth MAC entry belongs to the third MAC table and belongs to the learned MAC entries, and the first identifier is used to instruct the forwarding plane to set the fifth entry to a valid state; and the processing module is further configured to set the fifth MAC entry to the valid state.

In a specific design, the occupation rate of the storage space of the MAC entries of the forwarding plane does not exceed a second preset value; the receiving module is further configured to receive a sixth MAC entry and a second identifier that are sent by the control plane, where the sixth MAC entry belongs to only the third MAC table or belongs to only the learned MAC entries, and the second identifier is used to instruct the forwarding plane to set the sixth entry to an invalid state; the storage module is further configured to store the sixth MAC entry in the first MAC table; and the processing module is further configured to set the sixth MAC entry to the invalid state.

In a specific design, the receiving module is further configured to: receive the second identifier and the MAC entries in the third MAC table that are sent by the control plane; the storage module is further configured to store the MAC entries in the third MAC table in the first MAC table; and the processing module is further configured to set the MAC entries in the third MAC table to the invalid state based on the second identifier.

According to a fifth aspect, a network device for managing a media access control MAC table is provided, where a control plane of the network device includes a processing module, a sending module, and a receiving module.

The processing module is configured to obtain a first MAC entry.

The sending module is configured to send the first MAC entry and a first identifier to a forwarding plane of the network device, where the first identifier is used to instruct the forwarding plane to set the first MAC entry to a valid state in a first MAC table, and the first MAC entry includes a first MAC address.

In a specific design, the receiving module is further configured to: receive a first message sent by the forwarding plane, where the first message carries the first MAC address and is used to instruct the control plane to set a second MAC entry that is stored in a second MAC table stored in the control plane to an invalid state, and the second MAC entry includes the first MAC address; and the processing module is further configured to set the second MAC entry that is stored in the second MAC table stored in the processing module to the invalid state.

In a specific design, the receiving module is further configured to: receive a second message sent by the forwarding plane, where the second message carries a second MAC address; and the sending module is further configured to send a third MAC entry to the forwarding plane, where the third MAC entry includes the second MAC address.

In a specific design, when an occupation rate of storage space of MAC entries of the forwarding plane exceeds a first preset value, the second message further carries a third MAC address, where the third MAC address is a MAC address that is stored by the forwarding plane and has longest current invalid duration; and the sending module is further configured to: if the second MAC address exists in the control plane, and the second MAC address exists in a stored MAC table, send the third MAC entry to the forwarding plane; or if the second MAC address exists in the control plane, the second MAC address does not exist in a stored MAC table, and a boundary gateway protocol BGP MAC entry limit is deployed, after a fourth MAC entry is deleted from the stored MAC table, add the third MAC entry to the stored MAC table, and send the third MAC entry to the forwarding plane, where the fourth MAC entry includes the third MAC address.

In a specific design, the sending module is further configured to: send a MAC table obtaining request to a control and management device when a BGP session between the network device and a BGP peer is disconnected and reestablished; the receiving module is further configured to receive a third MAC table sent by the control and management device; the processing module is further configured to determine a fifth MAC entry based on learned MAC entries and the third MAC table, where the learned MAC entries are learned by the control plane based on the BGP peer; and the sending module is further configured to send the fifth MAC entry to the forwarding plane.

In a specific design, the processing module is further configured to determine a MAC entry that belongs to the third MAC table and belongs to the learned MAC entries as the fifth MAC entry; and the sending module is further configured to send the fifth MAC entry and the first identifier to the forwarding plane, where the first identifier is used to instruct the forwarding plane to set the fifth MAC entry to a valid state.

In a specific design, the occupation rate of the storage space of the MAC entries of the forwarding plane does not exceed a second preset value; the processing module is further configured to determine a MAC entry that belongs to only the third MAC table or belongs to only the learned MAC entries as a sixth MAC entry; and the sending module is further configured to send the sixth MAC entry and a second identifier to the forwarding plane, where the second identifier is used to instruct the forwarding plane to set the sixth MAC entry to an invalid state.

In a specific design, the sending module is further configured to: send a MAC table obtaining request to a control and management device when a BGP session between the network device and a BGP peer is disconnected and reestablished; the receiving module is further configured to receive a third MAC table sent by the control and management device; and the sending module is further configured to send MAC entries in the third MAC table and a second identifier to the forwarding plane, where the second identifier is used to instruct the forwarding plane to set the MAC entries in the third MAC table to an invalid state.

According to a sixth aspect, a network device for managing a MAC table is provided, including a processor and a memory. The network device is configured to implement the method for managing a MAC table provided in any one of the first aspect, the specific designs of the first aspect, the second aspect, or the specific designs of the second aspect.

According to a seventh aspect, a network device is provided. The network device includes a control plane and a forwarding plane, and is configured to implement the method according to any one of the first aspect, the specific designs of the first aspect, the second aspect, or the specific designs of the second aspect.

According to an eighth aspect, a computer-readable storage medium is provided, where the computer-readable storage medium stores instructions. When the computer-readable storage medium runs on a network device, the network device is enabled to perform the method for managing a MAC table in any one of the first aspect, the specific designs of the first aspect, the second aspect, the specific designs of the second aspect, the third aspect, or the specific designs of the third aspect.

According to a ninth aspect, a computer program product including instructions is provided. When the computer program product runs on a network device, the network device is enabled to perform the method for managing a MAC table in any one of the first aspect, the specific designs of the first aspect, the second aspect, the specific designs of the second aspect, the third aspect, or the specific designs of the third aspect.

The technical solutions provided in the embodiments of this application bring at least the following beneficial effects.

In the embodiments of this application, the control plane of the network device may obtain the first MAC entry, and send the first MAC entry and the first identifier to the forwarding plane of the network device. The forwarding plane of the network device stores, in the first MAC table, the first MAC entry sent by the control plane, and the state of the first MAC entry is set to the valid state. After the first MAC entry is stored in the forwarding plane, the forwarding plane changes the state of the first MAC entry to the invalid state after the first preset duration elapses and when the first preset condition is met, and sets the invalid duration for the first MAC entry. The first preset condition is that the forwarding plane does not receive the traffic corresponding to the first MAC address within the first preset duration after storing the first MAC entry. The first MAC address is a MAC address stored in the first MAC entry. In this way, after a MAC entry is stored in the forwarding plane, the MAC entry is set to an invalid state if no traffic matches the MAC entry for a period of time. This makes management of the MAC entry more reasonable.

DETAILED DESCRIPTION OF ILLUSTRATIVE EMBODIMENTS

To make objectives, technical solutions, and advantages of this application clearer, the following further describes implementations of this application in detail with reference to accompanying drawings.

To facilitate understanding of embodiments of this application, the following first describes a system architecture and concepts of nouns in the embodiments of this application.

The embodiments of this application are applicable to an EPVN network. The EPVN network includes a plurality of network devices, and the network device may be a service provider edge (PE) device. The network device may include a forwarding plane and a control plane. The control plane may be used to learn a MAC entry by using a BGP peer, and deliver the learned MAC entry to the forwarding plane. The forwarding plane guides forwarding of received traffic based on the received MAC entry and a locally learned MAC entry.

Figure 1:
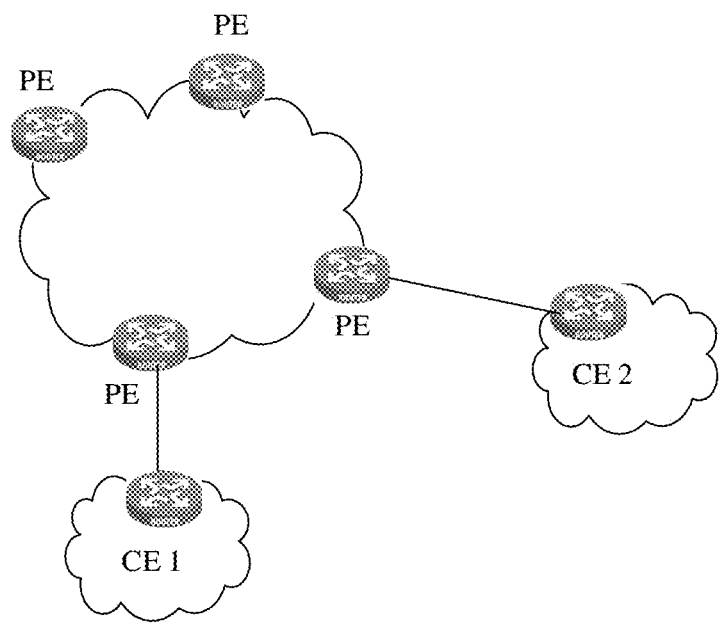
FIG. 1 is a schematic diagram of an EVPN according to an embodiment of this application.

FIG. 1 is a schematic diagram of networking of an EPVN. In the EPVN, to implement interworking between sites, an EPVN instance is created on network devices (namely, PE devices) on a carrier backbone network, and a customer edge (CE) device at each site is connected to the PE device. In addition, a neighbor relationship is established between the network devices. Because each site is a layer 2 network, the network device learns MAC entries rather than routes from CE devices. The network device forwards the MAC entries learned from the CE devices to other sites by using an EPVN-specific route type (namely, a BGP protocol). In this way, each network device in the EPVN has MAC entries of all CE devices.

It should be noted that, for a network device herein, the network device may learn MAC entries of a CE device connected to the network device, where these MAC entries may be referred to as local MAC entries. The network device learns, from another network device based on the BGP protocol, a MAC entry of a CE device connected to the another network device, and the another network device may be referred to as a BGP peer of the network device.

An embodiment of this application provides a method for managing a MAC table. The method may be performed by a network device, and the network device may be a PE device in an EPVN.

Figure 2:
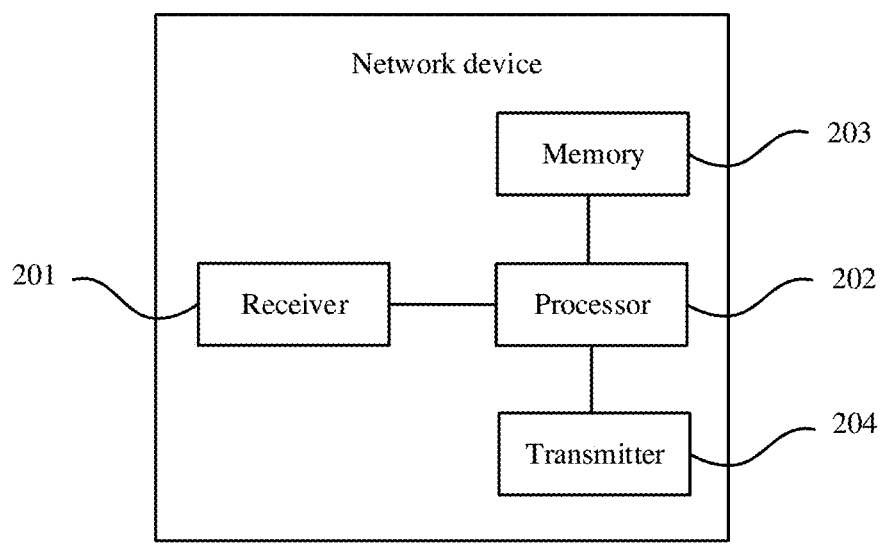
FIG. 2 is a schematic structural diagram of a network device according to an embodiment of this application.

FIG. 2 is a structural block diagram of a network device according to an embodiment of this application. The network device may include at least a receiver 201, a processor 202, a memory 203, and a transmitter 204. The receiver 201 may be configured to receive data, the transmitter 204 may be configured to send data, the memory 203 may be configured to store a software program and a module, and the processor 202 executes various functional applications and data processing by running the software program and the module that are stored in the memory 203. The memory 203 may mainly include a program storage area and a data storage area. The program storage area may store an operating system, an application required by at least one function, and the like. The storage data area may store data created according to use of the network device, and the like. In addition, the memory 203 may include a high-speed random access memory, and may further include a non-volatile memory, for example, at least one magnetic disk storage device, a flash storage device, or another volatile solid-state storage device. Correspondingly, the memory 203 may further include a memory controller, to provide the processor 202, the receiver 201, and the transmitter 204 with access to the memory 203. The processor 202 is a control center of the network device. The processor 202 connects parts of the entire network device through various interfaces and lines, performs various functions and data processing of the network device by running or executing the software program and/or the module stored in the memory 203, and invoking data stored in the memory 203, to perform overall monitoring on the network device.

In a specific implementation, the processor 202 may include one or more processing cores. Preferably, an application processor and a modem processor may be integrated into the processor 202, where the application processor mainly processes an operating system, a user interface, an application, and the like, and the modem processor mainly processes wireless communication. It may be understood that the modem processor may alternatively not be integrated into the processor 202.

The network device may include a forwarding plane and a control plane. The control plane may be implemented by a central processing unit (CPU), or may be implemented by a network processor (NP) with a control plane function. The forwarding plane may be a switching chip. For example, the forwarding plane may be implemented by an application-specific integrated circuit (ASIC), a programmable logic device (PLD), an NP, a core configured to implement the forwarding plane in a multi-core CPU, or any combination thereof. The PLD may be a complex programmable logic device (CPLD), a field-programmable gate array (FPGA), generic array logic (GAL), or any combination thereof.

Figure 3:
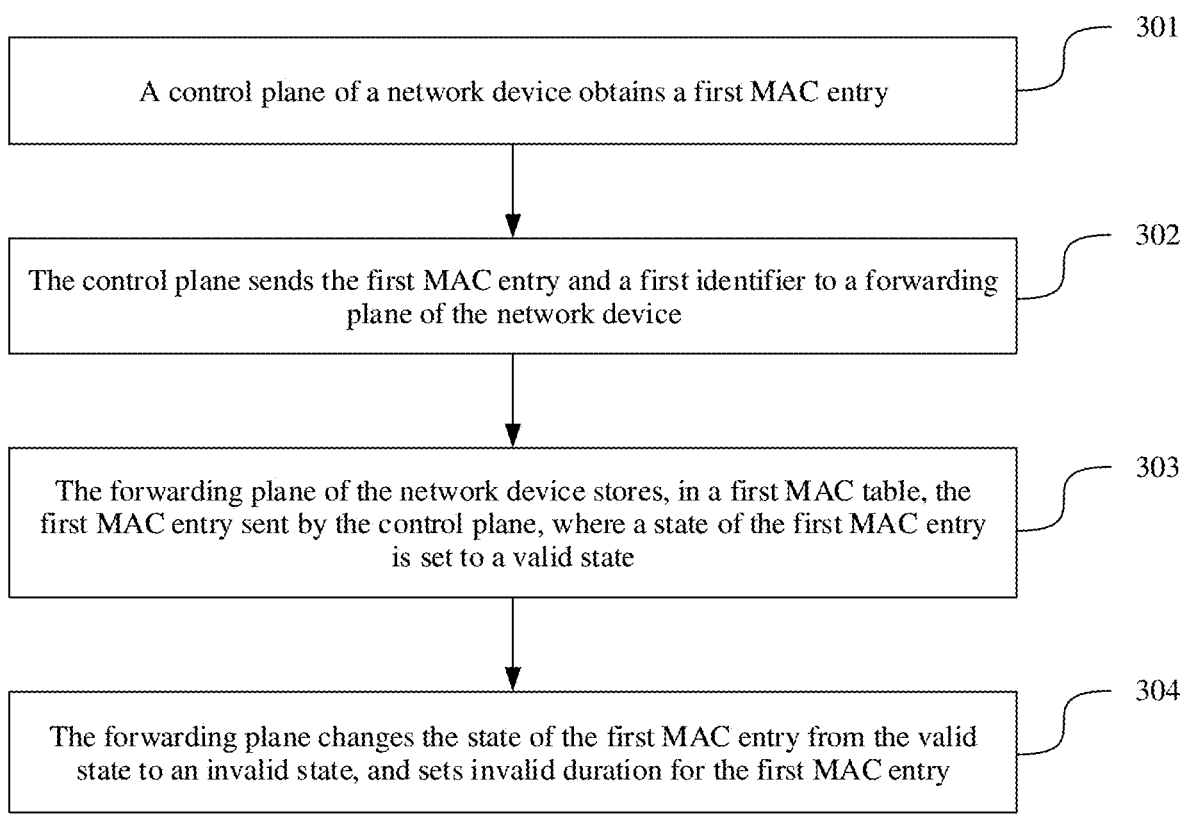
FIG. 3 is a schematic flowchart of a method for managing a MAC table according to an embodiment of this application.

With reference to a specific implementation, the following describes a processing procedure shown in FIG. 3 in detail. Content may be as follows.

Step 301: A control plane of a network device obtains a first MAC entry.

In implementation, during networking in an EPVN, the control plane of the network device may learn, from another network device based on a BGP protocol, a MAC entry (the learned MAC entry includes the first MAC entry) of a CE device connected to the another network device. The another network device may be referred to as a BGP peer of the network device, and the MAC entry includes a MAC address, an outbound interface corresponding to the MAC address, a broadcast domain, and the like.

Step 302: The control plane sends the first MAC entry and a first identifier to a forwarding plane of the network device, where the first identifier is used to instruct the forwarding plane to set the first MAC entry to a valid state in a first MAC table, and the first MAC entry includes a first MAC address.

In implementation, after obtaining the first MAC entry, the control plane may send the first MAC entry and the first identifier to the forwarding plane of the network device. The first identifier is used to instruct the forwarding plane to set the first MAC entry to the valid state in the stored first MAC table, and the first MAC entry includes the first MAC address.

Step 303: The forwarding plane of the network device stores, in the first MAC table, the first MAC entry sent by the control plane, where a state of the first MAC entry is set to the valid state.

The first MAC table is a MAC table stored by the forwarding plane of the network device.

In implementation, after receiving the first MAC entry and the first identifier that are sent by the control plane, the forwarding plane may store the first MAC entry in the first MAC table, and set the state of the first MAC entry to the valid state (as shown in Table 1, herein, a state flag may be added to the first MAC table to identify a state of a MAC entry).

TABLE 1

| MAC address | Broadcast domain | ... | State flag |
|---|---|---|---|
| First MAC address | A | ... | Valid state |
| ... | ... | ... | ... |

In Table 1, the first MAC address is a MAC address in the first MAC entry, the broadcast domain is A, the state is the valid state, and an ellipsis between the broadcast domain and the state flag indicates another attribute of the MAC entry.

In a specific implementation, when the state of the first MAC entry is set to the valid state, a state flag of the first MAC entry may be set to the first identifier. If a state flag of a MAC entry is the first identifier, it indicates that a state of the MAC entry is a valid state.

In addition, in this embodiment of this application, the forwarding plane of the network device may further learn a MAC entry from a CE device locally connected to the network device, and a state of the MAC entry learned from the local CE device is also set to a valid state. To prevent a local traffic attack, a MAC entry limit value of a local interface may be set. Generally, a local MAC entry limit value is related to a quantity of CEs connected to the network device. Generally, the MAC entry limit value is equal to the quantity of CEs connected to the network device. MAC entries mentioned later are MAC entries learned from the BGP peer based on the BGP protocol.

Step 304: The forwarding plane changes the state of the first MAC entry from the valid state to an invalid state, and sets invalid duration for the first MAC entry.

After the first MAC entry is stored in the forwarding plane, the state of the first MAC entry is changed to the invalid state after first preset duration elapses and when a first preset condition is met. The first preset condition is that the forwarding plane does not receive traffic corresponding to the first MAC address within the first preset duration after storing the first MAC entry, and the first MAC address is a MAC address included in the first MAC entry.

In implementation, after receiving traffic, the forwarding plane may obtain a destination MAC address of the traffic, and match the destination MAC address in the first MAC table. If the destination MAC address can be matched, the traffic is forwarded based on an outbound interface corresponding to the destination MAC address.

For the first MAC table, after the first MAC entry is stored in the forwarding plane, if there is no traffic whose destination MAC address is the same as the first MAC address (namely, the MAC address in the first MAC entry) after the first preset duration elapses, the forwarding plane may set, in the first MAC table, the state flag of the first MAC entry to a second identifier, to be specific, change the state of the first MAC entry from the valid state to the invalid state. The second identifier is used to instruct that the state of the MAC entry is the invalid state.

In addition, the forwarding plane may obtain pre-stored invalid duration, and set the invalid duration to the invalid duration of the first MAC entry. A table of the invalid duration may be added to the first MAC table. For example, as shown in Table 2, if the invalid duration is five minutes, five minutes may be written into the table of the invalid duration.

TABLE 2

| MAC address | Broadcast domain | ... | State flag | Invalid duration |
|---|---|---|---|---|
| First MAC address | A | ... | Second identifier | Five minutes |
| ... | ... | ... | ... | ... |

It should be noted that the invalid duration may be pre-configured in the forwarding plane, and invalid duration of each MAC entry is generally the same. The first identifier may be 0, and the second identifier may be 1.

It should further be noted that the destination MAC address rather than a source MAC address is matched because the destination MAC address rather than the source MAC address is used during forwarding. During forwarding, traffic without a matched destination MAC address is broadcast, regardless of a source MAC address. Therefore, the destination MAC address rather than the source MAC address needs to be matched.

In a specific implementation, to synchronize the forwarding plane with the control plane, after setting the state of the first MAC entry to the invalid state, the forwarding plane may further notify the control plane. Processing may be as follows.

The forwarding plane sends a first message to the control plane, where the first message is used to instruct the control plane to set a second MAC entry that is stored in a second MAC table stored in the control plane to an invalid state, and the second MAC entry includes the first MAC address. The control plane receives the first message sent by the forwarding plane, and the control plane sets the second MAC entry that is stored in the second MAC table stored in the control plane to the invalid state.

In implementation, after setting the state of the first MAC entry to the invalid state, the forwarding plane may generate the first message, add an identifier (the identifier may be the first MAC address) of the first MAC entry to the first message, and then send the first message to the control plane. the first message is used to instruct the control plane to set the second MAC entry that is stored in the second MAC table stored in the control plane to the invalid state.

After receiving the first message, the control plane may parse the first message to obtain the identifier of the first MAC entry, then obtain the stored second MAC table, find, in the second MAC table by using the identifier of the first MAC entry, the second MAC entry corresponding to the identifier of the first MAC entry, and then set a flag of a state of the second MAC entry to the second identifier, to be specific, a state of the second MAC is updated from a valid state to the invalid state.

In a specific implementation, to save storage space of MAC entries of the forwarding plane, a MAC entry that meets a specific condition may be deleted. Corresponding processing may be as follows:

The forwarding plane deletes the first MAC entry from the first MAC table, where after the first MAC entry is set to the invalid state, the first MAC entry is deleted after the invalid duration and when a second preset condition is met. The second preset condition is that the forwarding plane does not receive the traffic corresponding to the first MAC address within the invalid duration after setting the first MAC entry to the invalid state.

In implementation, after setting the state of the first MAC entry to the invalid state, the forwarding plane may determine whether traffic whose destination address is the first MAC address (namely, the traffic corresponding to the first MAC address) is received within the invalid duration. If the traffic whose destination address is the first MAC address is not received within the invalid duration, the forwarding plane may delete the first MAC entry from the first MAC table, to save the storage space of the MAC entries of the forwarding plane.

For example, the invalid duration of the first MAC entry is five minutes, and if the traffic whose destination address is the first MAC address is not received within five minutes after the first MAC entry is set to the invalid state, the first MAC entry may be deleted from the first MAC table.

In this way, a MAC entry in a valid state and a MAC entry in an invalid state are identified, and the MAC entry in the invalid state is preferably filtered out. Therefore, this makes limitation of the MAC entry more accurate and improves an anti-attack effect of the EVPN.

In a specific implementation, to reduce a quantity of times that traffic is multicast or broadcast in the forwarding plane, the forwarding plane may restore a MAC entry that meets a specific condition and is in an invalid state to a valid state. Corresponding processing may be as follows:

The forwarding plane changes the state of the first MAC entry from the invalid state to the valid state, where the state of the first MAC entry is changed to the valid state after the forwarding plane receives the traffic corresponding to the first MAC address within the invalid duration.

In implementation, after setting the state of the first MAC entry to the invalid state, the forwarding plane may determine whether the traffic whose destination address is the first MAC address (namely, the traffic corresponding to the first MAC address) is received within the invalid duration. If the traffic whose destination address is the first MAC address is received within the invalid duration, the state of the first MAC entry may be updated from the invalid state to the valid state.

For example, the invalid duration of the first MAC entry is five minutes. At the fourth minute after the first MAC entry is set to the invalid state, when the traffic whose destination address is the first MAC address is received, the state of the first MAC entry may be changed from the invalid state to the valid state.

In this way, it can be learned from the foregoing process that a frequently used MAC entry is generally not deleted. Therefore, when traffic corresponding to the MAC entry is received, the traffic may be forwarded based on the MAC entry. This can reduce a quantity of times that the traffic is broadcast or multicast.

In addition, when the state of the first MAC entry is changed from the invalid state to the valid state, the control plane may be further notified for change. Corresponding processing may be as follows.

The forwarding plane may send a third message to the control plane, where the third message may be used to indicate the control plane to set the second MAC entry that is stored in the second MAC table stored in the control plane to the valid state. After receiving the third message, the control plane may change the state of the second MAC entry to the valid state. In this way, it can be ensured that MAC entries of the forwarding plane and the control plane are synchronized as much as possible.

Figure 4:
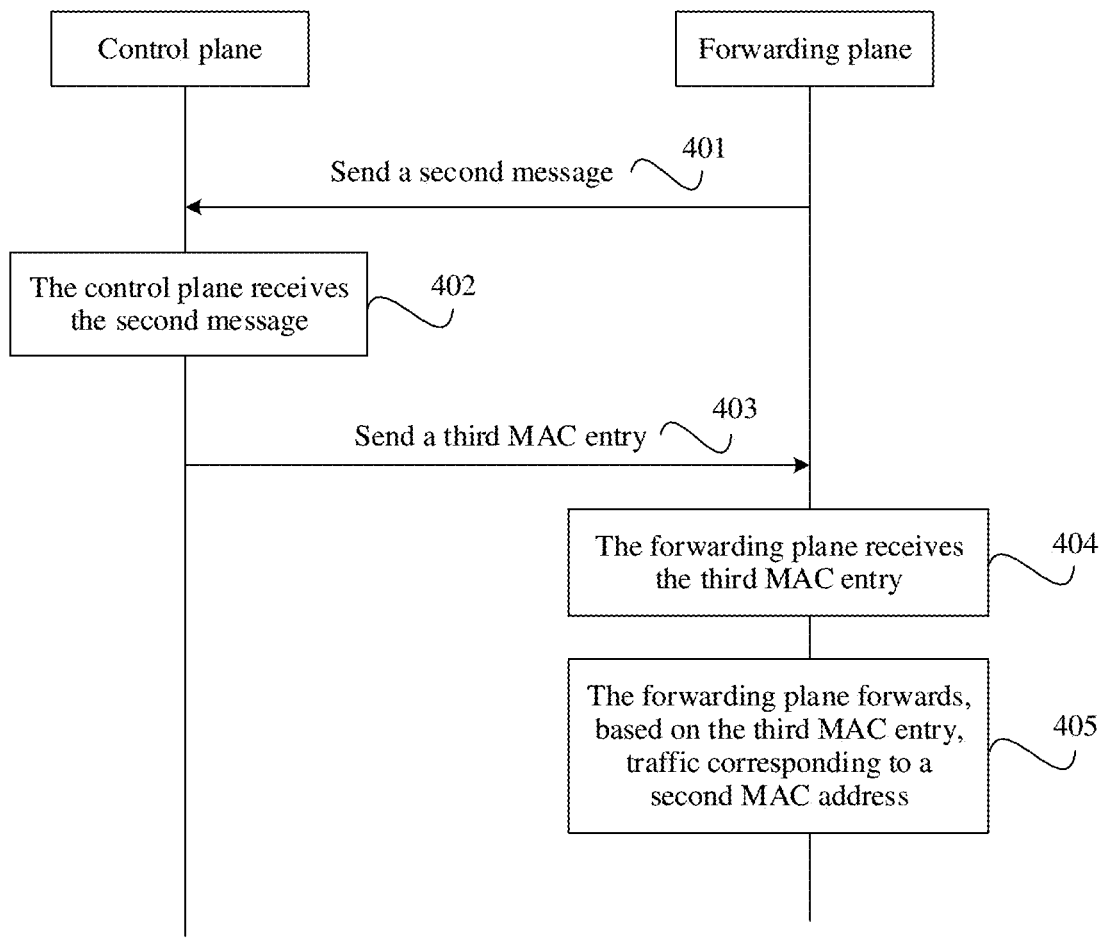
FIG. 4 is a schematic flowchart of a method for managing a MAC table according to an embodiment of this application.

In a specific implementation, as shown in FIG. 4, an embodiment of this application further provides the following processing when a destination address of traffic received by the forwarding plane cannot match a MAC entry in the first MAC table.

Step 401: The forwarding plane sends a second message to the control plane, where the second message carries a second MAC address and is used to request a third MAC entry, and the third MAC entry includes the second MAC address.

In implementation, when receiving traffic, the forwarding plane may search, by using a destination MAC address in the traffic, the first MAC table for a MAC entry in which the destination MAC address is located. If the destination MAC address (which may be referred to as the second MAC address subsequently) does not exist, the forwarding plane may generate the second message, enable the second message to carry the second MAC address, and then send the second message to the control plane.

Step 402: The control plane receives the second message sent by the forwarding plane, where the second message carries the second MAC address.

Step 403: The control plane sends the third MAC entry to the forwarding plane, where the third MAC entry includes the second MAC address.

In implementation, after receiving the second message, the control plane may parse the second message to obtain the second MAC address, and traverse a stored MAC table by using the second MAC address, to determine whether a MAC entry to which the second MAC address belongs exists. If the MAC entry (namely, the third MAC entry) to which the second MAC address belongs exists, the control plane may send the third MAC entry and the first identifier to the forwarding plane, where the first identifier is used to instruct the forwarding plane to set the third MAC entry to a valid state.

In addition, if the MAC entry to which the second MAC address belongs does not exist in the control plane, the control plane may generate a fourth message, and send the fourth message to the forwarding plane, where the fourth message is used to instruct the forwarding plane to delete traffic corresponding to the second MAC address this time. In this way, an attack can be avoided.

In a specific implementation, when an occupation rate of storage space of MAC entries of the forwarding plane is greater than a first preset value, processing in step 403 may be as follows.

When the occupation rate of the storage space of the MAC entries of the forwarding plane exceeds the first preset value, the second message further carries a third MAC address, where the third MAC address is a MAC address that is stored by the forwarding plane and has longest current invalid duration. If the second MAC address exists in the control plane and the second MAC address exists in the stored MAC table, the third MAC entry is sent to the forwarding plane. If the second MAC address exists in the control plane, the second MAC address does not exist in the stored MAC table, and a border gateway protocol BGP MAC entry limit is deployed, after a fourth MAC entry is deleted from the stored MAC table, the third MAC entry is sent to the stored MAC table, and the third MAC entry is sent to the forwarding plane. The fourth MAC entry includes the third MAC address.

The first preset value may be preset and stored in the forwarding plane, for example, may be 95%. The BGP MAC entry limit is a limit set for MAC entries learned based on a BGP peer. For example, if the BGP MAC entry limit of the control plane is 5000, MAC entries learned based on the BGP peer is actually 10000, but only 5000 MAC entries are stored in the MAC table of the control plane. The MAC table is delivered to the forwarding plane to guide traffic forwarding of the forwarding plane. The remaining 5000 MAC entries are not stored in the MAC table of the control plane but stored in another place of the control plane, and the 5000 MAC entries are not delivered to the forwarding plane.

In implementation, when receiving the traffic, the forwarding plane may search, by using the destination MAC address in the traffic, the first MAC table for the MAC entry in which the destination MAC address is located. If the destination MAC address (which may be referred to as the second MAC address subsequently) does not exist, a size of the storage space of the MAC entries of the forwarding plane may be obtained, and a current storage capacity of the MAC entries of the forwarding plane is obtained. The current storage capacity is compared with the size of the storage space of the MAC entries, to obtain a current occupation rate of the storage space of the MAC entries. The occupation rate is compared with the first preset value. If the occupation rate exceeds the first preset value, a MAC address (namely, the third MAC address) that is in the MAC entries and that has longest current invalid duration may be determined in the first MAC table, and the second message is sent to the control plane, where the second message carries the second MAC address and the third MAC address.

After receiving the second message, the control plane may determine whether the MAC table of the control plane stores the MAC entry of the second MAC address. If the MAC table of the control plane stores the MAC entry of the second MAC address, the control plane directly sends the third MAC entry to the forwarding plane.

If the MAC entry of the second MAC address is not stored in the MAC table of the control plane, but the control plane stores the third MAC entry of the second MAC address (in this case, the MAC entry of the second MAC address is generally not stored in the MAC table of the control plane, but is stored in another place), it may be determined whether a BGP MAC entry limit is deployed in the control plane. If the BGP MAC entry limit is deployed, the fourth MAC entry (the fourth MAC entry includes the third MAC address) may be deleted from the MAC table stored in the control plane. Then, the third MAC entry (the third MAC entry includes the second MAC address) is stored in the MAC table that is stored in the control plane, and the third MAC entry is sent to the forwarding plane.

In addition, generally, the storage space of the MAC entry of the control plane is relatively sufficient. Therefore, the second MAC address exists in the control plane, the MAC entry of the second MAC address is not stored in the MAC table of the control plane, and the BGP MAC entry limit is not deployed. This case generally does not exist, and therefore is not described herein.

Step 404: The forwarding plane receives the third MAC entry sent by the control plane. The forwarding plane stores the third MAC entry in the first MAC table, and sets the third MAC entry to a valid state.

In implementation, after receiving the third MAC entry sent by the control plane, the forwarding plane may store the third MAC entry in the first MAC table, and set the third MAC entry to the valid state. In this way, when subsequently receiving traffic whose destination address is the second MAC address, the forwarding plane may directly send the traffic based on the third MAC entry without by using the control plane.

In a specific implementation, when the occupation rate of the storage space of the MAC entries of the forwarding plane exceeds the first preset value, the second message further carries the third MAC address, where the third MAC address is a MAC address that is stored by the forwarding plane and has the longest current invalid duration. The forwarding plane can perform the following processing.

The forwarding plane deletes the fourth MAC entry from the first MAC table, where the fourth MAC entry stores the third MAC address.

In implementation, when the second message carries the third MAC address, after receiving the third MAC entry sent by the control plane, the forwarding plane may delete the fourth MAC entry (the fourth MAC entry includes the third MAC address) from the first MAC table, then add the third MAC entry, and set the state of the third MAC entry to the valid state.

In this way, when the storage space of the MAC entries of the forwarding plane is occupied relatively much, it is equivalent to that the fourth MAC entry is replaced with the third MAC entry, so that total occupied storage space remains unchanged.

Step 405: The forwarding plane forwards, based on the third MAC entry, the traffic corresponding to the second MAC address.

In implementation, the forwarding plane may forward, based on the second MAC address, the traffic whose target address is the second MAC address.

In addition, the fourth message may be further used to indicate the forwarding plane not to send the third message to the control plane when subsequently receiving the traffic whose destination address is the second MAC address. When receiving the fourth message, the forwarding plane may record the second MAC address in another MAC table. In this way, if the forwarding plane cannot find the second MAC address in the first MAC table, the forwarding plane may search the another MAC table for the second MAC address. If the second MAC address exists, the third message is not sent to the control plane. If the second MAC address does not exist, the third message may be sent to the control plane. In this way, processing resources can be saved.

In addition, herein, when sending the second message to the control plane, the forwarding plane may directly forward, in a broadcasting manner, the traffic whose destination address is the second MAC address. In this way, when receiving the fourth message sent by the control plane, the forwarding plane can record only subsequently received traffic corresponding to the second MAC address, and no longer report the second message to the control plane.

In a specific implementation, an embodiment of this application further provides corresponding processing in a process in which the forwarding plane sends the MAC table to a control and management device.

The forwarding plane sends a third MAC table to the control and management device at intervals of preset duration, where all MAC entries included in the third MAC table are set to a valid state, and the third MAC table is a subset of the first MAC table.

Figure 5:
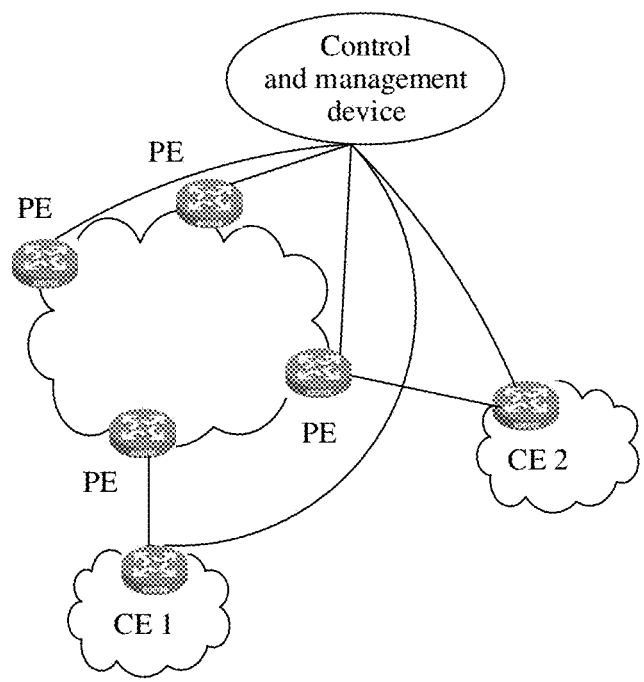
FIG. 5 is a schematic diagram in which a network device is connected to a control and management device according to an embodiment of this application.

The preset duration may be preset and is stored in the forwarding plane. As shown in FIG. 5, a connection is established between the control and management device and the network device, and the control and management device may be a software-defined networking (SDN) server or the like.

In implementation, after going online, the forwarding plane may obtain, at the intervals of preset duration, a MAC entry that is marked as a valid state in a current first MAC table, to form the third MAC table, and then send the third MAC table to the control and management device.

After receiving the third MAC table sent by the forwarding plane, the control and management device may replace a previously stored MAC table with the third MAC table received this time.

In this way, the control and management device backs up the MAC entry in the valid state.

Figure 6:
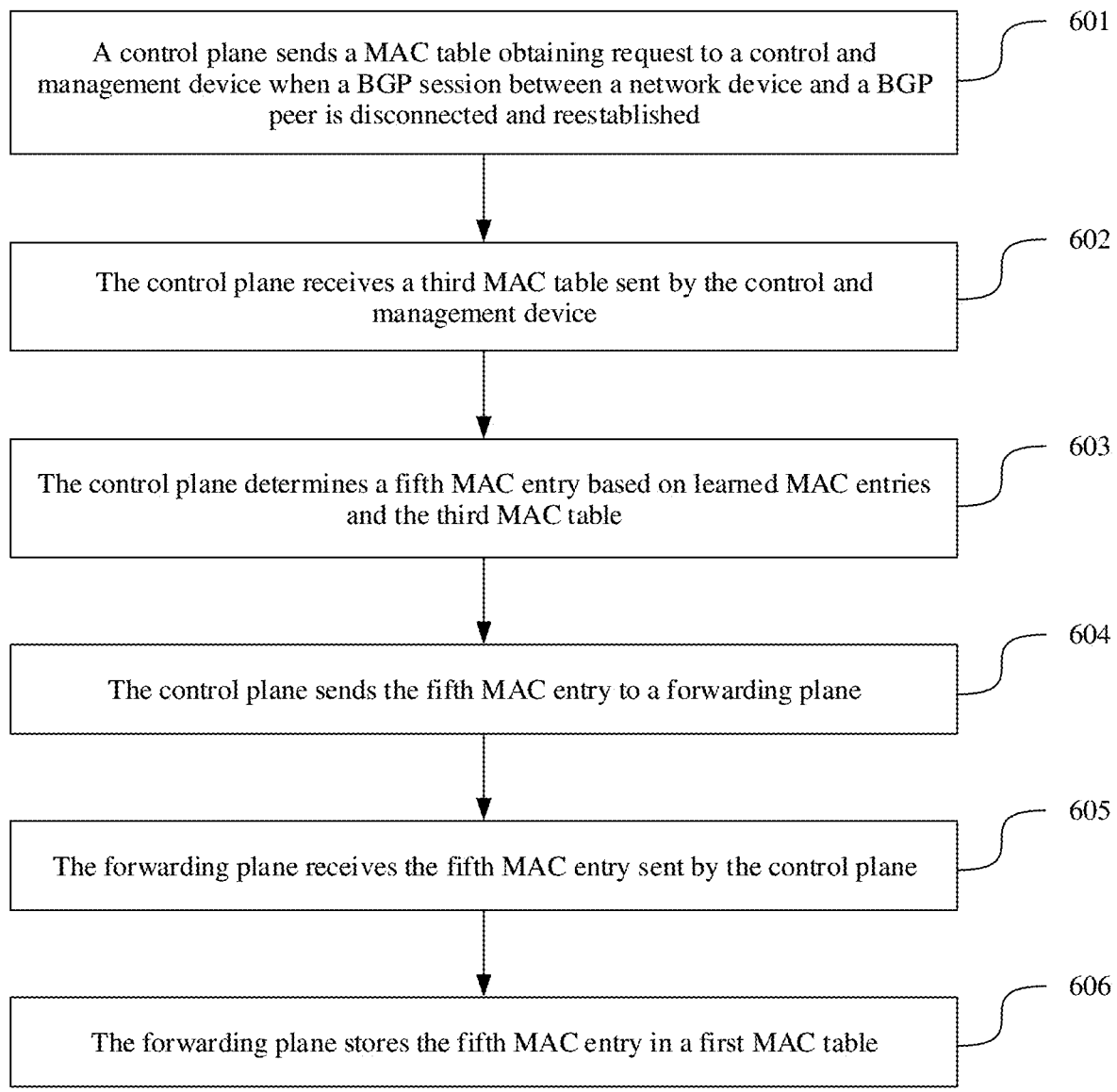
FIG. 6 is a schematic flowchart of a method for managing a MAC table according to an embodiment of this application.

In a specific implementation, when a BGP session between the network device and the BGP peer corresponding to the network device is disconnected and reestablished, the third MAC table may be obtained from the control and management device to guide forwarding of the forwarding plane. As shown in FIG. 6, corresponding processing steps may be as follows:

Step 601: The control plane sends a MAC table obtaining request to the control and management device when the BGP session between the network device and the BGP peer is disconnected and reestablished.

In implementation, the BGP session between the network device and the BGP peer corresponding to the network device is disconnected and reestablished when the network device is restarted. Alternatively, the BGP session between the network device and the BGP peer corresponding to the network device is reestablished after the BGP session between the network device and the BGP peer corresponding to the network device is disconnected. In this case, the control plane may send the MAC table obtaining request to the connected control and management device, and may learn the MAC entries from the BGP peer by using the BGP protocol.

After receiving the MAC table obtaining request sent by the control plane of the network device, the control and management device may determine to obtain a latest MAC table (namely, the third MAC table) that is received from the forwarding plane of the network device and that is stored in the control and management device, and then send the third MAC table to the control plane.

Step 602: The control plane receives the third MAC table sent by the control and management device.

Step 603: The control plane determines a fifth MAC entry based on the learned MAC entries and the third MAC table, where the learned MAC entries are learned by the control plane based on the BGP peer.

In implementation, after receiving the third MAC table sent by the control and management device, the control plane may determine the fifth MAC entry by using the learned MAC entries and the third MAC table.

In a specific implementation, the control plane may determine the fifth MAC entry in the following manner. Corresponding processing in step 603 may be as follows:

The control plane determines a MAC entry that belongs to the third MAC table and belongs to the learned MAC entries as the fifth MAC entry.

In implementation, the control plane may determine an intersection set of the MAC entries in the third MAC table and the MAC entries learned from the BGP peer, and determine a MAC entry in the intersection set as the fifth MAC entry.

Step 604: The control plane sends the fifth MAC entry to the forwarding plane.

In a specific implementation, corresponding to a fact that the fifth MAC entry belongs to the third MAC table and belongs to the learned MAC entries, processing in step 604 may be as follows:

The control plane sends the fifth MAC entry and the first identifier to the forwarding plane, where the first identifier is used to instruct the forwarding plane to set the fifth MAC entry to a valid state.

Step 605: The forwarding plane receives the fifth MAC entry sent by the control plane, where the fifth MAC entry is determined by the control plane based on the learned MAC entries and the third MAC table, and the learned MAC entries are learned by the control plane based on the border gateway protocol BGP peer.

In a specific implementation, for step 604 of sending the first identifier, processing in step 605 may be as follows.

The forwarding plane receives the fifth MAC entry and the first identifier that are sent by the control plane.

Step 606: The forwarding plane stores the fifth MAC entry in the first MAC table.

In implementation, after receiving the fifth MAC entry sent by the control plane, the forwarding plane may store the fifth MAC entry in the first MAC table.

In a specific implementation, for step 605 in which the forwarding plane receives the fifth MAC entry and the first identifier that are sent by the control plane, after step 606, the following processing may be further performed:

The forwarding plane sets the fifth MAC entry to the valid state.

It should be noted that, when the occupation rate of the storage space of the MAC entries of the forwarding plane exceeds a second preset value, the control plane may send only the fifth MAC entry to the forwarding plane and set the fifth MAC entry to the valid state without sending a subsequent sixth MAC entry. This can reduce occupation of the storage space of the MAC entries of the forwarding plane.

In this way, whether the storage space of the MAC entries of the forwarding plane is insufficient or not, an intersection set of MAC entries that are in a valid state and that are previously determined by the forwarding plane and MAC entries currently learned based on the BGP peer is sent to the forwarding plane, and is set to the valid state. This can reduce occupation of the storage space of the MAC entries of the forwarding plane.

In a specific implementation, when the storage space of the MAC entries of the forwarding plane does not exceed the second preset value, the forwarding plane and the control plane may further perform the following processing:

The control plane determines a MAC entry that belongs to only the third MAC table or belongs to only the learned MAC entries as the sixth MAC entry. The control plane sends the sixth MAC entry and the second identifier to the forwarding plane, where the second identifier is used to instruct the forwarding plane to set the sixth MAC entry to an invalid state. The forwarding plane receives the sixth MAC entry and the second identifier that are sent by the control plane, where the sixth MAC entry belongs to only the third MAC table or belongs to only the learned MAC entries, and the second identifier is used to instruct the forwarding plane to set the sixth entry to the invalid state. The forwarding plane stores the sixth MAC entry in the first MAC table, and sets the sixth MAC entry to the invalid state.

The second preset value may be preset and stored in the control plane, and the second preset value herein may be the same as the first preset value.

In implementation, before delivering a MAC entry to the forwarding plane, the control plane may send an obtaining request to the forwarding plane, where the obtaining request is used to request to obtain an occupation rate of storage space of the MAC entry. After receiving the obtaining request, the forwarding plane may determine a current occupation amount of the storage space of the MAC entry and a total amount of the storage space, compare the occupation amount with the total amount to obtain a current occupation rate of the MAC entry, and send the occupation rate to the control plane.

After receiving the occupation rate, the control plane may determine whether the occupation rate exceeds the second preset value. If the occupation rate does not exceed the second preset value, the control plane may determine a MAC entry that belongs to only the third MAC table or belongs to the MAC entries learned from the BGP peer as the sixth MAC entry, and then send the sixth MAC entry and the second identifier to the forwarding plane.

After receiving the sixth MAC entry and the second identifier, the forwarding plane may store the sixth MAC entry in the first MAC table, and set the state of the sixth MAC entry to the invalid state.

In this way, when the storage space of the forwarding plane is sufficient, the control plane may indicate the forwarding plane to distinguish between the MAC entry in the valid state and a MAC entry in an invalid state, and the MAC entry in the invalid state may be deleted as soon as possible. This can save the storage space of the MAC entries of the forwarding plane. In addition, a large quantity of MAC entries are delivered, which can reduce a probability that traffic is multicast or broadcast.

In addition, when the entire storage space of the MAC entries of the forwarding plane is occupied, preset warning information may be sent.

In a specific implementation, when a BGP session between the network device and the BGP peer in the network in which the network device is located is disconnected and reestablished, to shorten traffic interruption duration, the following processing may be performed:

When the BGP session between the network device and the BGP peer is disconnected and reestablished, the control plane sends the MAC table obtaining request to the control and management device. The control plane receives the third MAC table sent by the control and management device. The control plane sends MAC entries in the third MAC table and the second identifier to the forwarding plane, where the second identifier is used to instruct the forwarding plane to set the MAC entries in the third MAC table to an invalid state. The forwarding plane receives the second identifier and the MAC entries in the third MAC table that are sent by the control plane. The forwarding plane stores the MAC entries in the third MAC table in the first MAC table, and sets the MAC entries in the third MAC table to an invalid state based on the second identifier.

In implementation, the BGP session between the network device and the BGP peer corresponding to the network device is disconnected and reestablished when the network device is restarted. Alternatively, the BGP session between the network device and the BGP peer corresponding to the network device is reestablished after the BGP session between the network device and the BGP peer corresponding to the network device is disconnected. In this case, the control plane may send the MAC table obtaining request to the connected control and management device, and may learn the MAC entries from the BGP peer by using the BGP protocol.

After receiving the obtaining request, the control and management device may obtain a MAC table stored in the control and management device, namely, the third MAC table, and send the third MAC table to the control plane.

After receiving the third MAC table sent by the control and management device, the control plane may send the third MAC table and the second identifier to the forwarding plane. After receiving the third MAC table and the second identifier, the forwarding plane may store the MAC entries in the third MAC table in the first MAC table, and set these MAC entries to the invalid state. In this way, because a speed of obtaining the third MAC table is far less than that of learning the MAC entries from the BGP peer, the traffic interruption duration can be shortened.

After learning the MAC entries from the BGP peer subsequently, the control plane may determine the intersection set of the MAC entries learned from the BGP peer and the MAC entries in the third MAC table, and send the MAC entry corresponding to the intersection set and the first identifier to the forwarding plane. After receiving the first identifier, the forwarding plane may update states of the MAC entries in the intersection set from an invalid state to a valid state. In this way, these MAC entries can be prevented from being deleted, and a large amount of traffic can be preventing from being broadcast.

In this way, the forwarding plane periodically sends the MAC entries in the valid state to the control and management device. After the BGP session between the network device and the BGP peer is restored, the MAC entries in the valid state can be delivered to the forwarding plane as soon as possible to guide traffic forwarding of the forwarding plane. This can reduce a risk of broadcasting the large amount of traffic.

In the embodiments of this application, the control plane of the network device may obtain the first MAC entry, and send the first MAC entry and the first identifier to the forwarding plane of the network device. The forwarding plane of the network device stores, in the first MAC table, the first MAC entry sent by the control plane, and the state of the first MAC entry is set to the valid state. After the first MAC entry is stored in the forwarding plane, the forwarding plane changes the state of the first MAC entry to the invalid state after the first preset duration elapses and when the first preset condition is met, and sets the invalid duration for the first MAC entry. The first preset condition is that the forwarding plane does not receive the traffic corresponding to the first MAC address within the first preset duration after storing the first MAC entry, and the first MAC address is a MAC address stored in the first MAC entry. In this way, after a MAC entry is stored in the forwarding plane, the MAC entry is set to an invalid state if no traffic matches the MAC entry for a period of time. This makes management of the MAC entry more reasonable.

It should be further noted that, after a virtual private local area network (VPLS) evolves into the EVPN, because learning manners of MAC entries in the two technologies are different, a network device in the network has a higher requirement for a capacity of the MAC entry. This application solves this problem based on the foregoing processing, and reasons are as follows: On the premise of retaining an original advantage of the EVPN, because the MAC entry in the valid state can be identified, the MAC entry in the valid state is preferably delivered. This reduces a capacity requirement of the MAC entry in the EVPN. The capacity requirement of the MAC entry in the EVPN is the same as that of the MAC entry in the VPLS. A capacity requirement of the EVPN for a MAC entry in the network device is basically the same as that of VPLS for the MAC entry in the network device. Therefore, evolution from the VPLS to the EVPN is smoother.

Figure 7:
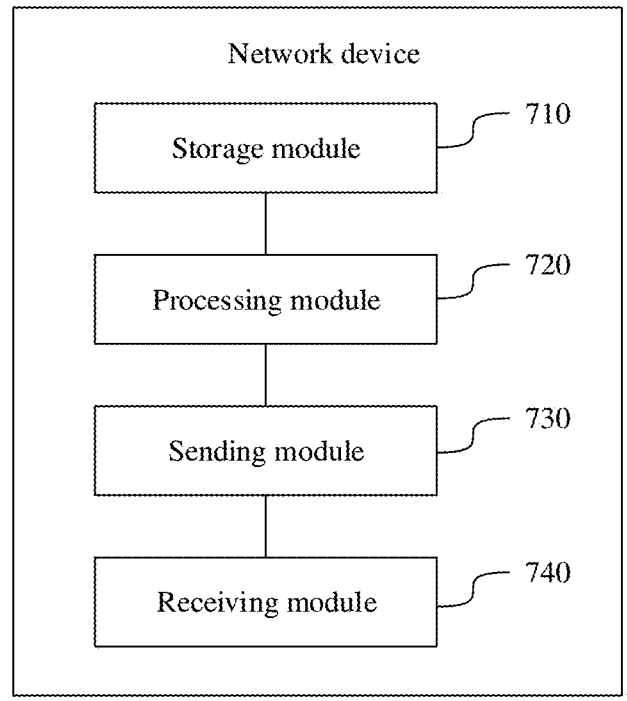
FIG. 7 is a schematic structural diagram of a network device for managing a MAC table according to an embodiment of this application.

FIG. 7 is a structural diagram of a network device for managing a MAC table according to an embodiment of this application. The network device may be implemented as a part or all of the network device by using software, hardware, or a combination of software and hardware. The network device provided in this embodiment of this application may implement the procedures in FIG. 3, FIG. 4, and FIG. 6 in the embodiments of this application. A forwarding plane of the network device includes a storage module 710, a processing module 720, a sending module 730, and a receiving module 740.

The storage module 710 is configured to store, in a first MAC table, a first MAC entry sent by a control plane, where a state of the first MAC entry is set to a valid state. The storage module 710 may specifically implement a storage function in the foregoing step 303 and other implicit steps.

The processing module 720 is configured to change the state of the first MAC entry from the valid state to an invalid state, and set invalid duration for the first MAC entry. The processing module 720 may specifically implement a storage function in the foregoing step 304 and other implicit steps.

After the first MAC entry is stored in the forwarding plane, the state of the first MAC entry is changed to the invalid state after first preset duration elapses and when a first preset condition is met. The first preset condition is that the forwarding plane does not receive traffic corresponding to a first MAC address within the first preset duration after storing the first MAC entry, and the first MAC address is a MAC address included in the first MAC entry.

In a specific implementation, the sending module 730 is further configured to: send a first message to the control plane, where the first message is used to instruct the control plane to set a second MAC entry that is stored in a second MAC table stored in the control plane to an invalid state, and the second MAC entry includes the first MAC address.

In a specific implementation, the processing module 720 is further configured to: delete the first MAC entry from the first MAC table, where after the first MAC entry is set to the invalid state, the first MAC entry is deleted after the invalid duration elapses and a second preset condition is met, and the second preset condition is that the forwarding plane does not receive the traffic corresponding to the first MAC address within the invalid duration after setting the first MAC entry to the invalid state.

In a specific implementation, the processing module 720 is further configured to: change the state of the first MAC entry from the invalid state to the valid state, where the state of the first MAC entry is changed to the valid state after the forwarding plane receives the traffic corresponding to the first MAC address within the invalid duration.

In a specific implementation, the sending module 730 is further configured to: send a second message to the control plane, where the second message carries a second MAC address and is used to request a third MAC entry, and the third MAC entry includes the second MAC address; the receiving module 740 is further configured to: receive the third MAC entry sent by the control plane; and the processing module 720 is further configured to: store the third MAC entry in the first MAC table, and set the third MAC entry to a valid state; and forward, based on the third MAC entry, traffic corresponding to the second MAC address.

In a specific implementation, when an occupation rate of storage space of MAC entries of the forwarding plane exceeds a first preset value, the second message further carries a third MAC address, where the third MAC address is a MAC address that is stored by the forwarding plane and has longest current invalid duration; and the processing module 720 is further configured to delete a fourth MAC entry from the first MAC table, where the fourth MAC entry stores the third MAC address.

In a specific implementation, the sending module 730 is further configured to: send a third MAC table to a control and management device at intervals of preset duration, where all MAC entries included in the third MAC table are set to a valid state, and the third MAC table is a subset of the first MAC table.

In a specific implementation, the receiving module 740 is further configured to: receive a fifth MAC entry sent by the control plane, where the fifth MAC entry is determined by the control plane based on learned MAC entries and the third MAC table, and the learned MAC entries are learned by the control plane based on a border gateway protocol BGP peer; and the storage module 710 is further configured to store the fifth MAC entry in the first MAC table.

In a specific implementation, the receiving module 740 is further configured to: receive the fifth MAC entry and a first identifier that are sent by the control plane, where the fifth MAC entry belongs to the third MAC table and belongs to the learned MAC entries, and the first identifier is used to instruct the forwarding plane to set the fifth entry to a valid state; and the processing module 720 is further configured to set the fifth MAC entry to the valid state.

In a specific implementation, the occupation rate of the storage space of the MAC entries of the forwarding plane does not exceed a second preset value; the receiving module 740 is further configured to receive a sixth MAC entry and a second identifier that are sent by the control plane, where the sixth MAC entry belongs to only the third MAC table or belongs to only the learned MAC entries, and the second identifier is used to instruct the forwarding plane to set the sixth entry to an invalid state; the storage module 710 is further configured to store the sixth MAC entry in the first MAC table; and the processing module 720 is further configured to set the sixth MAC entry to the invalid state.

In a specific implementation, the receiving module 740 is further configured to: receive the second identifier and the MAC entries in the third MAC table that are sent by the control plane; the storage module 710 is further configured to store the MAC entries in the third MAC table in the first MAC table; and the processing module 720 is further configured to set the MAC entries in the third MAC table to an invalid state based on the second identifier.

Figure 8:
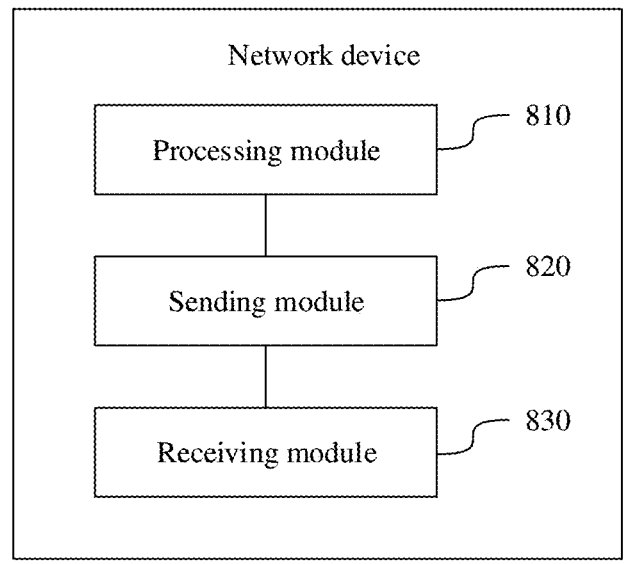
FIG. 8 is a schematic structural diagram of a network device for managing a MAC table according to an embodiment of this application.

FIG. 8 is a structural diagram of a network device for managing MAC according to an embodiment of this application. The network device may be implemented as a part or all of the network device by using software, hardware, or a combination of software and hardware. The network device provided in this embodiment of this application may implement the procedures in FIG. 3, FIG. 4, and FIG. 6 in the embodiments of this application. A control plane of the network device includes a processing module 810, a sending module 820, and a receiving module 830.

The processing module 810 is configured to obtain a first MAC entry, and may specifically implement a storage function in the foregoing step 303 and other implicit steps.

The sending module 820 is configured to send the first MAC entry and a first identifier to a forwarding plane of the network device, and may specifically implement a storage function in the foregoing step 302 and other implicit steps. The first identifier is used to instruct the forwarding plane to set the first MAC entry to a valid state in a first MAC table, and the first MAC entry includes a first MAC address.

In a specific implementation, the receiving module 830 is further configured to: receive a first message sent by the forwarding plane, where the first message carries the first MAC address and is used to instruct the control plane to set a second MAC entry that is stored in a second MAC table stored in the control plane to an invalid state, and the second MAC entry includes the first MAC address; and the processing module 810 is further configured to set the second MAC entry that is stored in the second MAC table stored in the processing module 810 to the invalid state.

In a specific implementation, the receiving module 830 is further configured to: receive a second message sent by the forwarding plane, where the second message carries a second MAC address; and the sending module 820 is further configured to send a third MAC entry to the forwarding plane, where the third MAC entry includes the second MAC address.

In a specific implementation, when an occupation rate of storage space of MAC entries of the forwarding plane exceeds a first preset value, the second message further carries a third MAC address, where the third MAC address is a MAC address that is stored by the forwarding plane and has longest current invalid duration; and the sending module 820 is further configured to: if the second MAC address exists in the control plane, and the second MAC address exists in a stored MAC table, send the third MAC entry to the forwarding plane; or if the second MAC address exists in the control plane, the second MAC address does not exist in a stored MAC table, and a boundary gateway protocol BGP MAC entry limit is deployed, after a fourth MAC entry is deleted from the stored MAC table, add the third MAC entry to the stored MAC table, and send the third MAC entry to the forwarding plane, where the fourth MAC entry includes the third MAC address.

In a specific implementation, the sending module 820 is further configured to: send a MAC table obtaining request to a control and management device when a BGP session between the network device and a BGP peer is disconnected and reestablished; the receiving module 830 is further configured to receive a third MAC table sent by the control and management device; the processing module 810 is further configured to determine a fifth MAC entry based on learned MAC entries and the third MAC table, where the learned MAC entries are learned by the control plane based on the BGP peer; and the sending module 820 is further configured to send the fifth MAC entry to the forwarding plane.

In a specific implementation, the processing module 810 is further configured to determine a MAC address that belongs to the third MAC table and belongs to the learned MAC entries as the fifth MAC entry; and the sending module 820 is further configured to send the fifth MAC entry and the first identifier to the forwarding plane, where the first identifier is used to instruct the forwarding plane to set the fifth MAC entry to a valid state.

In a specific implementation, the occupation rate of the storage space of the MAC entries of the forwarding plane does not exceed a second preset value; the processing module 810 is further configured to determine a MAC entry that belongs to only the third MAC table or belongs to only the learned MAC entries as a sixth MAC entry; and the sending module 820 is further configured to send the sixth MAC entry and a second identifier to the forwarding plane, where the second identifier is used to instruct the forwarding plane to set the sixth MAC entry to an invalid state.

In a specific implementation, the sending module 820 is further configured to: send a MAC table obtaining request to a control and management device when a BGP session between the network device and a BGP peer is disconnected and reestablished; the receiving module 830 is further configured to receive a third MAC table sent by the control and management device; and the sending module 820 is further configured to send the MAC entries in the third MAC table and a second identifier to the forwarding plane, where the second identifier is used to instruct the forwarding plane to set the MAC entries in the third MAC table to an invalid state.

In the embodiments of this application, the control plane of the network device may obtain the first MAC entry, and send the first MAC entry and the first identifier to the forwarding plane of the network device. The forwarding plane stores the first MAC entry in the first MAC table, and the state of the first MAC entry is set to the valid state. After the first MAC entry is stored in the forwarding plane, the forwarding plane changes the state of the first MAC entry to the invalid state after the first preset duration elapses and when the first preset condition is met, and sets the invalid duration for the first MAC entry. The first preset condition is that the forwarding plane does not receive the traffic corresponding to the first MAC address within the first preset duration that elapses after the first MAC entry is stored, and the first MAC address is a MAC address stored in the first MAC entry. In this way, after a MAC entry is stored in the forwarding plane, the MAC entry is set to an invalid state if no traffic matches the MAC entry for a period of time. This makes management of the MAC entry more reasonable.

It should be noted that, when the network device for managing a MAC table provided in the foregoing embodiment manages the MAC, division into the functional modules is merely used as an example for description. In actual application, the foregoing functions may be allocated to different functional modules for implementation based on a requirement. To be specific, an internal structure of the network device is divided into the different functional modules, to implement all or some of the foregoing functions. In addition, the embodiment of the network device for managing a MAC table and the embodiment of the method for managing MAC belong to a same inventive concept. For a specific implementation process of the embodiment of the network device for managing a MAC table, refer to the method embodiment, and details are not described herein again.

Optionally, an embodiment of this application further provides a computer-readable storage medium. The computer-readable storage medium stores instructions. When the computer-readable storage medium runs on a network device, the network device is enabled to perform the method for managing a MAC table.

Optionally, an embodiment of this application further provides a computer program product including instructions. When the computer program product runs on a network device, the network device is enabled to perform the method for managing a MAC table.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, for example, a server or a data center, integrating one or more usable media. The usable medium may be a magnetic medium (for example, a floppy disk, a hard disk, a magnetic tape, or the like), an optical medium (for example, a digital video disk (DVD) or the like), a semiconductor medium (for example, a solid-state drive or the like).

The foregoing descriptions are merely an embodiment of this application, but are not intended to limit this application. Any modification, equivalent replacement, or improvement made without departing from the spirit and principle of this application should fall within the protection scope of this application.

What is claimed is:

1. A method, comprising:
   storing, by a forwarding plane of a network device, in a first media access control (MAC) table, a first MAC entry sent by a control plane, wherein a state of the first MAC entry is set in the first MAC table to a valid state; and
   after a first preset duration elapses and in response to a first preset condition being met, changing, by the forwarding plane, the state of the first MAC entry in the first MAC table from the valid state to an invalid state by setting a state flag in the first MAC entry, and setting an invalid duration for the first MAC entry,
   wherein:
   the first preset condition is that the forwarding plane does not receive any traffic corresponding to a first MAC address within the first preset duration after storing the first MAC entry in the first MAC table, and the first MAC address is comprised in the first MAC entry, and
   the first MAC entry, comprising the state flag indicating the invalid state, remains in the first MAC table after being changed to the invalid state.

2. The method according to claim 1, further comprising:
   sending, by the forwarding plane, a first message to the control plane, wherein the first message instructs the control plane to set a second MAC entry that is stored in a second MAC table that is stored in the control plane to the invalid state, and the second MAC entry comprises the first MAC address.

3. The method according to claim 1, further comprising:
   after the first MAC entry is set to the invalid state in the first MAC table, and after the invalid duration elapses and a second preset condition is met, deleting, by the forwarding plane, the first MAC entry from the first MAC table; and
   wherein the second preset condition is that the forwarding plane does not receive any traffic corresponding to the first MAC address within the invalid duration after setting the first MAC entry to the invalid state in the first MAC table.

4. The method according to claim 1, further comprising:
   after the forwarding plane receives traffic corresponding to the first MAC address within the invalid duration, changing, by the forwarding plane, the state of the first MAC entry in the first MAC table from the invalid state to the valid state.

5. The method according to claim 1, further comprising:
   sending, by the forwarding plane, a second message to the control plane, wherein the second message carries a second MAC address, the second message requests a third MAC entry, and the third MAC entry comprises the second MAC address;
   receiving, by the forwarding plane, the third MAC entry sent by the control plane;
   storing, by the forwarding plane, the third MAC entry in the first MAC table, and setting the third MAC entry in the first MAC table to the valid state; and
   forwarding, by the forwarding plane based on the third MAC entry, traffic corresponding to the second MAC address.

6. A network device, comprising:
   a non-transitory memory, wherein the non-transitory memory stores computer-readable instructions; and
   one or more processors connected to the non-transitory memory, wherein the one or more processors are configured to execute the computer-readable instructions, and executing the computer-readable instructions causes the network device to implement a forwarding plane configured to:

store, in a first media access control (MAC) table, a first MAC entry sent by a control plane, wherein a state of the first MAC entry is set to a valid state in the first MAC table; and after a first preset duration elapses, and in response to a first preset condition being met, changing, by the forwarding plane, the state of the first MAC entry in the first MAC table from the valid state to an invalid state by setting a state flag in the first MAC entry, and setting an invalid duration for the first MAC entry, wherein the first preset condition is that the forwarding plane does not receive any traffic corresponding to a first MAC address within the first preset duration after storing the first MAC entry in the first MAC table, and the first MAC address is comprised in the first MAC entry, and the first MAC entry, comprising the state flag indicating the invalid state, remains in the first MAC table after being changed to the invalid state.

7. The network device according to claim 6, wherein the forwarding plane is further configured to:
send a first message to the control plane, wherein the first message instructs the control plane to set a second MAC entry that is stored in a second MAC table stored in the control plane to the invalid state, and the second MAC entry comprises the first MAC address.

8. The network device according to claim 6, wherein the forwarding plane is further configured to:
after the first MAC entry is set to the invalid state in the first MAC table, and after the invalid duration elapses and a second preset condition is met, delete the first MAC entry from the first MAC table; and
wherein the second preset condition is that the forwarding plane does not receive any traffic corresponding to the first MAC address within the invalid duration after setting the first MAC entry to the invalid state in the first MAC table.

9. The network device according to claim 6, wherein the forwarding plane is further configured to:
after receiving traffic corresponding to the first MAC address within the invalid duration, change the state of the first MAC entry from the invalid state to the valid state in the first MAC table.

10. The network device according to claim 6, wherein the forwarding plane is further configured to:
send a second message to the control plane, wherein the second message carries a second MAC address, the second message requests a third MAC entry, and the third MAC entry comprises the second MAC address;
receive the third MAC entry sent by the control plane;
store the third MAC entry in the first MAC table, and set the third MAC entry to the valid state in the first MAC table; and
forward, based on the third MAC entry, traffic corresponding to the second MAC address.

11. The network device according to claim 10, wherein:
when an occupation rate of storage space of MAC entries of the forwarding plane exceeds a first preset value, the second message further carries a third MAC address, the third MAC address is stored by the forwarding plane and has a longest current invalid duration of MAC entries stored by the forwarding plane and
the forwarding plane is further configured to:
delete a fourth MAC entry from the first MAC table, wherein the fourth MAC entry stores the third MAC address.

12. The network device according to claim 6, wherein the forwarding plane is further configured to:
send a third MAC table to a control and management device and at intervals of preset duration, wherein all MAC entries comprised in the third MAC table are set to the valid state, and the third MAC table is a subset of the first MAC table.

13. The network device according to claim 12, wherein the forwarding plane is further configured to:
receive a fifth MAC entry sent by the control plane, wherein the fifth MAC entry is determined by the control plane based on learned MAC entries and the third MAC table, and the learned MAC entries are learned by the control plane based on a border gateway protocol (BGP) peer; and
store the fifth MAC entry in the first MAC table.

14. A network device for managing a media access control (MAC) table, wherein the network device comprises:
a non-transitory memory, wherein the non-transitory memory stores computer-readable instructions; and
one or more processors connected to the non-transitory memory, wherein the one or more processors are configured to execute the computer-readable instructions, and executing the computer-readable instructions causes the network device to implement a control plane, and the control plane is configured to:
obtain a first MAC entry; and
send the first MAC entry and a first identifier to a forwarding plane of the network device, wherein the first identifier instructs the forwarding plane to set the first MAC entry to a valid state in a first MAC table by setting a state flag included in the first MAC entry to indicate the valid state, and the first MAC entry comprises a first MAC address.

15. The network device according to claim 14, wherein the control plane is further configured to:
receive a first message sent by the forwarding plane, wherein the first message carries the first MAC address and the first message instructs the control plane to set a second MAC entry that is stored in a second MAC table stored in the control plane to an invalid state, and the second MAC entry comprises the first MAC address; and
set the second MAC entry that is stored in the second MAC table stored in the control plane to the invalid state.

16. The network device according to claim 14, wherein the control plane is further configured to:
receive a second message sent by the forwarding plane, wherein the second message carries a second MAC address; and
send a third MAC entry to the forwarding plane, wherein the third MAC entry comprises the second MAC address.

17. The network device according to claim 14, wherein the control plane is further configured to:
send a MAC table obtaining request to a control and management device when a border gateway protocol (BGP) session between the network device and a BGP peer is disconnected and reestablished;
receive, by the control plane, a third MAC table sent by the control and management device;
determine, by the control plane, a fifth MAC entry based on learned MAC entries and the third MAC table, wherein the learned MAC entries are learned by the control plane based on the BGP peer; and send, by the control plane, the fifth MAC entry to the forwarding plane.

18. The network device according to claim 17, wherein, to determine the fifth MAC entry based on the learned MAC entries and the third MAC table, the control plane is configured to:
  determine a MAC entry that belongs to the third MAC table and that belongs to the learned MAC entries to be the fifth MAC entry, and
  to send the fifth MAC entry to the forwarding plane, the control plane is configured to:
  send the fifth MAC entry and the first identifier to the forwarding plane, wherein the first identifier instructs the forwarding plane to set the fifth MAC entry to the valid state.

19. The network device according to claim 18, wherein an occupation rate of storage space of the MAC entries of the forwarding plane does not exceed a second preset value; and
  wherein the control plane is further configured to:
  determine a MAC entry that belongs to only the third MAC table or that belongs to only the learned MAC entries to be a sixth MAC entry; and
  send the sixth MAC entry and a second identifier to the forwarding plane, wherein the second identifier instructs the forwarding plane to set the sixth MAC entry to an invalid state.

20. The network device according to claim 14, wherein the control plane is further configured to:
  send a MAC table obtaining request to a control and management device when a border gateway protocol (BGP) session between the network device and a BGP peer is disconnected and reestablished;
  receive a third MAC table sent by the control and management device; and
  send MAC entries in the third MAC table and a second identifier to the forwarding plane, wherein the second identifier instructs the forwarding plane to set the MAC entries in the third MAC table to an invalid state.

* * * * *